United States Patent [19]

McCarter

[11] 4,302,345
[45] Nov. 24, 1981

[54] FLAME RETARDING CELLULOSIC MATERIALS WITH SODIUM OR POTASSIUM THIOCYANATE

[75] Inventor: Robert J. McCarter, Gaithersburg, Md.

[73] Assignee: The United States of America as represented by the Secretary of Commerce, Washington, D.C.

[21] Appl. No.: 186,871

[22] Filed: Sep. 12, 1980

[51] Int. Cl.³ .......................... B27K 3/02; C09K 3/28
[52] U.S. Cl. .................................. 252/62; 106/18.22; 106/18.23; 252/607; 428/921
[58] Field of Search .................. 252/62, 607, 601; 106/18.22, 18.26; 162/159; 428/921, 537

[56] References Cited

U.S. PATENT DOCUMENTS

| | | | |
|---|---|---|---|
| 1,853,818 | 4/1932 | Kobbe | 428/921 X |
| 2,713,008 | 7/1955 | Schulenburg | 428/254 |
| 2,867,549 | 1/1959 | Outterson | 427/299 |
| 3,027,326 | 3/1962 | Moffett | 252/62 |
| 4,012,507 | 3/1977 | Knoepfler et al. | 427/212 |
| 4,038,451 | 7/1977 | Brown et al. | 428/274 |
| 4,184,969 | 1/1980 | Bhat | 252/62 X |

FOREIGN PATENT DOCUMENTS 647582  12/1950  United Kingdom .

Primary Examiner—P. E. Willis, Jr.
Attorney, Agent, or Firm—Eugene J. Pawlikowski; Alvin J. Englert

[57] ABSTRACT

A flame resistant cellulosic insulation material, method of treating loosefill cellulosic material and compositions for imparting flame resistance and flame and smolder resistance to such materials are disclosed utilizing thiocyanate compounds interstitially distributed throughout the cellulosic insulation material as a flame retardant. Sodium and potassium thiocyanate are used in extremely small quantities in insulation materials and impart flame resistance due to the hygroscopic migration of the compounds into the insulation material. The effectiveness of such small quantities of thiocyanate make possible the addition and retention of effective amounts of powdered smolder inhibitors such as boric acid, and sulfur.

39 Claims, No Drawings

FLAME RETARDING CELLULOSIC MATERIALS WITH SODIUM OR POTASSIUM THIOCYANATE

BACKGROUND OF THE INVENTION

1. Field of the Invention

This application concerns flame retardancy of loose-fill insulation materials, especially cellulosic insulation materials. More particularly, the invention relates to flame resistant insulation materials, methods of treating insulation materials to render them flame resistant, compositions for imparting flame resistance to insulation materials, flame and smolder resistant compositions and flame and smolder resistant loosefill insulation materials.

2. Description of the Prior Art

Loosefill insulating materials have been well known in the construction industry for many years and are becoming widely utilized in recent times as a major material for insulation in the housing industry, commercial building industry, as well as in the do-it-yourself home improvement market. The chief advantages of loosefill insulation material are the abundant availability of cellulosic materials such as shredded wood and paper products, the excellent insulation properties of these materials at relatively low costs, and the ability of the material to flow into and fill wall cavities. Unfortunately, the nature of loosefill insulation material, especially cellulosic materials, renders them unacceptable as safe insulation materials in their untreated form due to their high flammability and resultant danger as a fire and smoke hazard.

Accordingly, it has become conventional in the loosefill fiber insulation industry to treat cellulosic material with combustion retardant compounds such as boric acid, ammonium phosphate, aluminum sulfate and the like prior to use. Representative patent literature in this area includes U.S. Pat. No. 3,027,326 to Moffett who discloses the treatment of insulation materials such as shredded wood and shredded paperfluff with a composition consisting of ammonium sulfate, boric acid and potassium alum to reduce the flame and smoldering tendencies of the insulation materials. Other references disclosing the use of phosphate, borates and sulfonates as fire retardants for cellulosic materials include U.S. Pat. No. 2,867,549 to Outterson, U.S. Pat. No. 4,012,507 to Knoepfler and U.S. Pat. No. 4,038,451 to Brown et al.

The addition of ammonium sulfate, boric acid and like compounds to cellulosic insulation increases the density of the material and, accordingly, decreases the insulating value of the insulation. At the same time, the cellulosic insulation industry has encountered difficulties in complying with the federal Interim Safety Standard for Cellulose Insulation issued by the Consumer Product Safety Commission. As a result, chemical loadings as high as 35 to 50 weight percent of retardants based on the weight of the cellulosic material, have been reported as common. At this level the insulative property of the cellulosic material is severely diminished and, in fact, such high loadings reach a point at which further addition of retardants would impair rather than improve the performance of the insulation in combustion tests, i.e. density effects adverse to retardation would predominate over the retarding effects on the material.

The foregoing difficulties result from the fact that it is common to add flame retardant compositions as solids to cellulosic insulation material by mere mixing of the powdered compositions with the cellulosic insulation material in a conventional milling operation. Retention of the retardant powders by the fibrous insulation is not complete and becomes more imperfect as the amounts of added powder increase. During subsequent packaging and handling of insulation material, a greater portion of the powdered flame retardant may settle out from the insulation material and becomes totally ineffective as loadings of powder are increased.

The cellulosic insulation industry has recognized that it would be advantageous to disperse retardants intimately onto insulation material so that the retardants might function more effectively and the quantity of retardants added might be appreciably reduced. Intimate dispersion of retardants into the cellulosic material would also eliminate the need for overloading the insulation material to compensate for the settling problem which would in turn further reduce the required quantity of retardant and improve the insulating value of the material.

Addition of flame retardants from solutions is common practice with materials other than loose-fill insulation. Impregnation of other cellulosic materials from solutions has been widely practiced for many years. Preservation agents such as mold inhibitors, plasticizers and flame retardants have been added to cellulosic materials by spraying aqueous, sometimes resinous, solutions of materials onto the cellulose. An example of one such application of mold inhibitor is found in U.S. Pat. No. 2,713,008 wherein solutions containing 4 to 20% zinc thiocyanate are sprayed onto various cellulosic materials. Application of plasticizing and flame retarding agents by immersing cellulosic material in the solution to be impregnated is disclosed in British Pat. No. 647,582. This patent describes an improvement in the process of treating regenerated cellulose sheets with a combined plasticizer-fire retardant by replacing ammonium thiocyanate with guanadine thiocyanate as the plasticizer-fire retardant. In each of these treatments, the application of large amounts of solution to the cellulosic material was tolerable. The treatment with solution, however, cannot be tolerated by cellulosic insulation materials when the required amounts of solution are large. The time, energy and equipment required for the subsequent necessary drying of the insulation material has been found uneconomic and has seriously restricted the insulation industry's use of treating insulation materials with solutions.

SUMMARY OF THE INVENTION

It is, therefore, a primary object of the present invention to provide flame retardancy of loosefill, insulation materials by means of intimate dispersion of flame retardants into the insulation materials without a drying operation.

This object has been achieved by the surprising discovery that sodium and potassium thiocyanate can be applied as powders or as concentrated solutions of small volume and will subsequently disperse or migrate into the cellulosic fibers upon exposure to humidity to become highly efficient flame inhibitors. The interval of time for complete migration and dispersion of the thiocyanate into the fibers will vary from a few hours with the high humidities frequently prevailing in insulation plants to a longer period with moderate humidities.

Accordingly, the invention provides for improved flame resistant cellulosic insulation materials and for an improved process for making such materials. The intimate interstitial dispersion of compounds into the insulation material, comprising the cellulosic fibrous mass of sufficiently low density to provide high insulating effect and acceptable flame retardancy, has been heretofore unachievable in an economical fashion. The present invention achieves such an intimate dispersion and yields excellent flame retardancy with a surprisingly small quantity of retardant compound. This compound is a thiocyanate selected from the group consisting of sodium thiocyanate, potassium thiocyanate and mixtures thereof.

The discovery that interstitial dispersion of these flame retardants in such minor amounts has additionally enabled the formulation of compositions with smolder inhibiting products, corrosion inhibitors and the like in highly advantageous quantities permitting excellent retention of insulation values.

The amounts of sodium or potassium thiocyanate necessary to provide suitable flame retardancy in cellulosic insulation material may vary in the range of 1 to 2 wt. % depending upon the effects of other agents combined in the treatment. Generally, it is suitable to employ sodium or potassium thiocyanate in an addition of about 1.5 wt. %. With such a small weight addition of flame retardant the weight addition of other agents in powder form, i.e. smolder and corrosion inhibitors, may be sufficiently low that their retention by the fibrous insulation is good. In one embodiment of the invention, sodium or potassium thiocyanate may be mixed with boric acid or sulfur as a smolder inhibitor to achieve excellent insulation materials resistant to combustion. Boric acid or sulfur or combinations thereof, may commonly be employed in amounts ranging from about 10% to about 15% or more based on the weight of the cellulosic material. In addition, corrosion inhibitors of up to 1 or 1½% may be advantageously employed.

In a formulation according to the invention, the total insulation treating agent comprises as low as about 13% addition of combined flame retardant, smolder inhibitor and corrosion inhibitor. This small quantity of material may be added in powder form by the conventional milling or mixing techniques, when ambient humidities are less than 40% relative humidity or precautions are taken to limit exposure of the thiocyanate to air of higher humidity so that it remains in solid form prior to mixing with the fibers.

The thiocyanate compounds are to an extent hygroscopic and accordingly, after application, absorb moisture from the air, i.e. deliquesce, and begin migration into the cellulose fibers when the insulation is exposed to humidities exceeding 40% relative humidity. The migration may be accomplished in a manner of hours or considerably longer depending upon the extent the humidity the material is exposed to exceeds 40% relative humidity. Thus, the dispersion of thiocyanates into the cellulosic insulation material may be completed during the manufacturing process or during shipping, storing, handling or even after installation of the cellulosic material.

In a preferred embodiment, the thiocyanate is dissolved in water and the resultant solution in an appropriate proportion is sprayed onto the insulation at some convenient point in the production process. For example, it may be sprayed subsequent to the last hammer mill, as per current practice for addition of some corrosion inhibitors in solution or it may be sprayed before the last hammer mill, etc. In some cases, the thiocyanate and the corrosion inhibitor may be combined in solution and simultaneously applied as a spray to the insulation. In the embodiment of adding thiocyanate from solution, concerns or precautions relative to plant humidities and premature deliquescence of the thiocyanate are substantially avoided. The addition of smolder inhibitors, in powder form, and corrosion inhibitors, if preferred in powder form, would be performed conventionally in the hammer-milling.

DESCRIPTION OF THE PREFERRED EMBODIMENTS

The most advantageous application of the present invention arises in the manufacture and use of cellulosic insulation from wood fiber fluff derived from used paper products such as newspaper. This material is readily available and yields a highly efficient insulation material after the fluffing process in a hammermill. Accordingly, in the following examples, wood fiber fluff is utilized exclusively as it represents the most economical and widely available source of loosefill insulation material. However, it should be noted that the following examples are not intended to limit the invention to this particular form of cellulosic insulation material.

To demonstrate the preferred embodiment of the present invention, a large amount of wood fiber fluff was prepared from reasonably well milled "over issue" newspaper, i.e., newsprint with a content of inorganic impurities in the lower end of the commercial range. Samples of this fibrous material were then mixed with various fire retardant compositions to achieve a final insulation material having optimum fire retardancy and other properties such as smolder inhibition, corrosion resistance and handling properties suitable for use as insulation material.

Test samples of the instant invention exhibited flame retardant, corrosion resistant and smolder inhibiting characteristics sufficient to pass current federal standards for insulation materials of this type. These standards will be described in greater detail in the following.

The results demonstrated that sodium and potassium thiocyanate may be used in surprisingly small quantities to provide flame retardancy, as used with smolder inhibiting and corrosion inhibiting agents. More importantly, the results demonstrate that the overall loading of these treatment materials to the cellulose insulation sample did not begin to reach the high loading required by conventional fire retardant compounds and compositions. In fact the total loading of flame retardant, smolder inhibitor and corrosion inhibitor was optimally found to be in the range of about 12 to 15%. Preferred amounts of sodium and potassium thiocyanate were found to be about 1.5%. All percentages are expressed as a weight percent of the cellulosic content of the insulation.

As will be demonstrated in the examples presented, the amounts of smolder inhibitors will preferably be within the range of about 10 to 13%.

Description of Testing Procedures

As a method of testing the relative flame resistant, smolder resistant, and corrosion resistant properties of the cellulosic insulation materials employed, a standardized test is run on each sample for determining the flame retardancy and separate standardized tests are run on each of the materials for determining the smolder inhibiting effects of the treated cellulosic material as well as the corrosion resistance of such materials. Each of the tests described below are included in the federal Interim Safety Standard for Cellulose Insulation. Flame retardancy is determined by measuring the radiant flux critical to sustaining flaming of the insulation material under conditions simulating summer time conditions of an attic floor. Smolder inhibition is determined by measuring the smoldering combustion tendencies of the insulation material in what has become known as the "cigarette smolder" test. Corrosion resistance is determined by subjecting the treated insulation material to specific temperature and humidity conditions for a certain period of time. Each test is described in greater detail in the following:

Critical Radiant Flux

The test for resistance to flame propagation uses a rectangular tray filled with specimen insulation placed in proximity to a gas-fired radiant panel such that the surface of the insulation is exposed to a radiant flux declining from 1.2 to 0.1 watts/cm$^2$ along the length of the tray. After a pre-heat interval, the insulation is ignited by a pilot flame at the "hot" end of the tray. If flame spread on the insulation surface extinguishes short of the "cool" end of the tray, the flux corresponding to the furthest point of burning is noted as the "critical radiant flux," which must equal or exceed 0.12 watts/cm$^2$ to pass the test criterion.

Smoldering Combustion

The method of this test evaluates the tendency of thermal insulation material to support smoldering combustion and tests the tendency of the material to support and propagate smoldering combustion subsequent to exposure to a standard ignition source. The ignition source is a lighted cigarette inserted vertically with the lit end upward into the center of an insulation material sample. Measurements are taken to determine the extent of smoldering combustion. That is, the damage to the test specimen is measured with respect to the specimen weight loss and the extent of charring, as well as any other observable combustion behaviors such as progression to flaming combustion. The lighted cigarette represents a smolder ignition source of moderate intensity, such as may contact insulation installed in residential buildings, for example, a wiring hotspot, the back side of a recessed light fixture, or the metal surface of a heater or furnace flue.

The burning of the cigarette and the specimen is allowed to proceed undisturbed in the test sample for at least two hours or until the smoldering is no longer progressing. After completion of the burning, the specimen holder is weighed and the percent loss of the original specimen is calculated. The degree of charring is also measured to the nearest half centimeter. Acceptable levels for weight loss and charring distance are judged to be respectively less than 15% of the specimen weight, and no charring within 4 cm of the sides of the specimen holder.

The Corrosion Test

Clean test coupons of aluminum, copper or steel are placed on presaturated portions of cellulosic insulation material inside a crystallizing dish. Additional presaturated portions of cellulosic material are then placed on top of the metal coupon and the composite is tamped to assure an even distribution of the material and good contact of the insulation with the metal as well as the elimination of air pockets next to the metal coupons. Crystallizing dishes are then placed in a humidity chamber preconditioned to 48.9°±1.7° C. and maintained at 97±1.5% relative humidity. The specimens remain in the chamber for 336±4 hours. Upon removal from the chamber treatment, the composite specimens are disassembled, thoroughly washed, brushed to remove the loose corrosion products and cleaned. Non-corrosiveness is determined by the absence of any perforation through the 3 ml thickness of the metal coupons.

EXAMPLE I

Batches of the reasonably well milled over issue newsprint in amounts of 200 grams are mixed in a ball mill with the desired amount of powdered sodium or potassium thiocyanate compound, smolder inhibitor compound and corrosion inhibitor compound. Mixing is performed until all newspaper fluff is mixed with the powdered retardants and inhibitors. The time for mixing generally is about 4 hours and subsequent exposure to humid air about 18 hours. Several samples are tested and the following formulations are found to pass the cigarette smolder test and closely group about the pass criterion of the radiant panel test. Corrosion test results for three principal formulations are indicated in compliance, but are noted as general corrosion rates since the tests were performed with thicker than standard coupons. Formulations and test results are presented in Table I.

TABLE I

|  | BATCH DESIGNATION | A | B | C | D | E | F | Y | Z |
|---|---|---|---|---|---|---|---|---|---|
|  | Sodium Thiocyanate (NaSCN) | 1.0 | 1.5 | 1.5 | 1.5 | 1.5 | 2.0 |  |  |
|  | Potassium Thiocyanate (KSCN) |  |  |  |  |  |  | 1.5 | 1.5 |
|  | Boric Acid (H$_3$BO$_3$) | 10.0 | 12.0 | 5.0 | 3.0 |  |  | 12.0 | 5.0 |
| Addition of | Sulfur (S) |  |  | 6.0 | 10.0 | 12.0 | 12.0 |  | 6.0 |
| (wt. % of fibers) | Dibasic Sodium Phosphate (Na$_2$HPO$_4$) | 1.0 | 1.0 | 0.5 | 1.0 |  |  | 1.0 | 1.0 |
|  | Monobasic Potassium Phosphate (KH$_2$PO$_4$) |  |  |  |  | 0.25 | 0.3 |  |  |
|  | Sodium Polysilicate (Na$_2$O . 2 ½(SiO$_2$ . H$_2$O) |  |  | 0.1 |  | 0.2 | 0.25 |  |  |
|  | Radiant Panel CFR, Watts/cm$^2$ | 0.11 | 0.14 | 0.16 | 0.13 | 0.10 | 0.11 | 0.12 | 0.11 |
|  | Cigarette Smolder Test | pass | pass | pass | pass | pass | pass | pass | pass |
|  | Corrosion Tests, Average Corrosion Rate, Millimeters per year |  |  |  |  |  |  |  |  |
|  | Steel(cold-rolled,shim stock, 3-mil) |  | 0.24 | 0.26 |  | 0.72 |  |  |  |
|  | Copper(soft,shim stock 10-mil) |  | nil | 0.04 |  | 0.02 |  |  |  |
|  | Aluminum (2024-T3 sheet, |  |  |  |  |  |  |  |  |

TABLE I-continued

| BATCH DESIGNATION | A | B | C | D | E | F | Y | Z |
|---|---|---|---|---|---|---|---|---|
| 20-mil) | | | 0.01 | 0.01 | | 0.01 | | |

EXAMPLE II

Well milled over issued newsprint is passed through a sprayer station in a conventional cellulosic insulation manufacturing process. The sprayer station is located after the last milling operation and before the main blower which conveys the insulation material to a collection bin. The fluffed insulation material is sprayed at the sprayer station with a treatment solution comprising the sodium or potassium thiocyanate flame retardant, and a water soluble corrosion inhibitor. The amount of thiocyanate compound and corrosion inhibitor is determined by the concentration of the solution for the spraying operation. The rate solutions are sprayed onto the cellulosic material varies according to the speed of the milled cellulose past the spray station. The milled cellulose is already treated with sulfur or boric acid smolder inhibitors in the hammermill. Migration of the treating agents begins immediately upon application of the solution with complete interstitial dispersion being accomplished in a shorter period of time in comparison to the application of powdered agents under comparable humidity conditions.

The invention is not intended to be limited to the procedures and components given in the foregoing examples. These examples serve to disclose specific embodiments in their most complete description. It is particularly important to note that while the specific deliquescent flame inhibitors are the central focus of the invention, the invention is not to be limited to the particular smolder inhibitors and corrosion inhibitors described. Any smolder inhibitor or corrosion inhibitor suitable and compatible with the procedures described herein and particularly with the sodium and potassium thiocyanate flame retardants are contemplated to comprise part of the instant invention. Furthermore, additional agents and adjuvants suitable for use in cellulosic insulation applications are also encompassed by this invention.

What is claimed is:

1. A flame resistant cellulosic insulation material comprising:
   a cellulosic fibrous mass of sufficiently low density to provide insulating effects;
   a compound selected from the group consisting of sodium thiocyanate, potassium thiocyanate and mixtures thereof.

2. The flame resistant cellulosic insulation material of claim 1 containing at least about 1% of said thiocyanate compound based on the weight of said cellulosic fibrous mass.

3. The flame resistant cellulosic insulation material of claim 1 containing from about 1% to about 2% of said thiocyanate compound.

4. The flame resistant cellulosic insulation material of claim 1 wherein said thiocyanate compound is intimately dispersed in said cellulosic fibrous mass by way of hygroscopic migration of said compound into the cellulosic fibers.

5. The flame resistant cellulosic insulation material of claim 1 further comprising at least about 10% of a smolder inhibiting compound based on the weight of said cellulosic fibrous mass.

6. The flame resistant cellulosic insulation material of claim 5 comprising from about 10% to about 13% of said smolder inhibiting compound based on the weight of said cellulosic fibrous mass.

7. The flame resistant cellulosic insulation material of claim 5 wherein said smolder inhibiting compound is selected from the group consisting of boric acid, sulfur, and mixtures thereof.

8. The flame resistant cellulosic insulation material of claim 1 or 5 further comprising an effective amount of corrosion inhibitor.

9. The flame resistant cellulosic insulation material of claim 8 wherein said corrosion inhibitor is selected from the group consisting of dibasic sodium phosphate ($Na_2HPO_4$), potassium phosphate ($KH_2PO_4$), sodium polysilicate and mixtures thereof.

10. The flame resistant cellulosic insulation material of claim 9 comprising from about 0.3 to about 1.5% of said corrosion inhibitor based on the weight of said cellulosic fibrous mass.

11. A method of flame proofing cellulosic insulating materials comprising:
    treating the insulation material with a compound selected from the group consisting of sodium thiocyanate, potassium thiocyanate and mixtures thereof in an amount of at least about 1% by weight based on the weight of the cellulosic insulation material.

12. The method of claim 11 comprising treating said insulation material with an effective amount of a smolder inhibitor.

13. The method of claim 12 comprising treating said insulation material with an effective amount of corrosion inhibitor.

14. The method of claim 11 wherein said treatment with said thiocyanate compound is conducted during the milling of a cellulosic material into a condition suitable for use as insulation material.

15. The method of claim 11 wherein said treating step is conducted after the milling of a cellulosic material into a condition suitable for use as insulation material.

16. The method of claim 15 wherein said treatment step comprises spraying said insulation material with a solution of said thiocyanate.

17. The method of claim 14 wherein said smolder inhibitor treating step and flame retardant treating step are conducted simultaneously.

18. The method of claim 16 wherein said smolder inhibitor treating step and said flame retardant treating step are conducted simultaneously.

19. The method of claim 17 or 18 comprising the simultaneous treatment with corrosion inhibitor.

20. The method of claim 12 wherein said smolder inhibitor is selected from the group consisting of sulfur, boric acid, and mixtures thereof.

21. The method of claim 13 wherein said corrosion inhibitor is selected from the group consisting of dibasic sodium phosphate ($Na_2HPO_4$), potassium phosphate ($KH_2PO_4$), sodium polysilicate and mixtures thereof.

22. The method of claim 11 wherein said thiocyanate compound is added in an amount from about 1% to about 2% by weight.

23. The method of claim 12 wherein said smolder inhibitor compound is added in an amount of at least about 10% by weight.

24. The method of claim 13 wherein said corrosion inhibitor is present in an amount from about 0.45 to about 1% by weight.

25. A composition for the flame retarding and smolder inhibiting treatment of cellulosic insulation materials comprising:
   a flame retardant compound selected from the group consisting of sodium thiocyanate, potassium thiocyanate and mixtures thereof, and a smolder inhibitor compound selected from the group consisting of sulfur, boric acid, and mixtures thereof.

26. The composition of claim 25 further comprising a corrosion inhibitor.

27. The composition of claim 25 wherein said flame retardant is sodium thiocyanate.

28. The composition of claim 25 wherein said flame retardant is potassium thiocyanate.

29. The composition of claim 25 wherein said flame retardant is a mixture of sodium and potassium thiocyanate.

30. A method for treating cellulosic insulation material comprising:
   applying a flame retardant compound selected from the group consisting of sodium thiocyanate, potassium thiocyanate and mixtures thereof to cellulosic insulation material, and interstitially dispersing said flame retardant compound into said insulation material.

31. The method of claim 30 wherein said interstitial dispersing step comprises the deliquescence of said flame retardant compound and migration of said compound into the cellulosic fibers of said cellulosic insulation material.

32. The method of claim 31 wherein said deliquescence and migration are controlled by variation of ambient humidity and temperature conditions.

33. The method of claim 32 comprising adding a smolder inhibiting compound to said cellulosic insulation material.

34. The method of claim 33 comprising adding a corrosion inhibiting agent to said cellulosic insulation material.

35. The method of claim 30 comprising treating cellulosic material to a fluffing step to yield cellulosic insulation material.

36. The method of claim 33 wherein the step of applying said flame retardant compound comprises adding said compound in powder form during the fluffing of cellulosic material to cellulosic insulation material.

37. The method of claim 33 wherein the step of applying said flame retardant compound comprises spraying said compound onto said cellulosic insulation material.

38. The method of claim 36 or 37 comprising adding a smolder inhibiting compound in powder form during the fluffing of cellulose material to cellulosic insulation materal.

39. The method of claim 36 or 37 comprising adding a corrosion inhibiting agent to said cellulosic insulation material by spraying said agent onto said cellulosic insulation material.

* * * * *